US008010263B2

(12) United States Patent
Morris

(10) Patent No.: US 8,010,263 B2
(45) Date of Patent: Aug. 30, 2011

(54) METHOD AND APPARATUS FOR MULTIVARIATE ACTIVE DRIVELINE DAMPING

(75) Inventor: Robert L. Morris, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 404 days.

(21) Appl. No.: 11/386,337

(22) Filed: Mar. 22, 2006

(65) Prior Publication Data
US 2007/0225887 A1   Sep. 27, 2007

(51) Int. Cl.
*G06F 7/00* (2006.01)

(52) U.S. Cl. ............... 701/51; 701/54; 701/69; 701/22; 903/940

(58) Field of Classification Search ............. 701/22, 701/51, 54, 69, 99, 101, 102, 111; 180/65.1–65.4; 903/940
See application file for complete search history.

(56) References Cited

U.S. PATENT DOCUMENTS

| | | | | |
|---|---|---|---|---|
| 5,452,207 A | * | 9/1995 | Hrovat et al. ............. | 701/1 |
| 5,931,757 A | * | 8/1999 | Schmidt .................. | 475/2 |
| 6,193,628 B1 | * | 2/2001 | Hrovat et al. ............. | 477/3 |
| 6,687,607 B2 | * | 2/2004 | Graf et al. ............... | 701/202 |
| 6,720,746 B2 | * | 4/2004 | Amann et al. ............ | 318/114 |
| 6,832,148 B1 | | 12/2004 | Bennett | |
| 6,868,318 B1 | | 3/2005 | Cawthorne | |
| 7,154,236 B1 | | 12/2006 | Heap | |
| 2003/0098187 A1 | * | 5/2003 | Phillips et al. ........... | 180/65.3 |
| 2003/0162620 A1 | * | 8/2003 | Kmicikiewicz ........... | 475/211 |
| 2005/0076958 A1 | | 4/2005 | Foster | |
| 2005/0077867 A1 | | 4/2005 | Cawthorne | |
| 2005/0077877 A1 | | 4/2005 | Cawthorne | |
| 2005/0080523 A1 | | 4/2005 | Bennett | |
| 2005/0080527 A1 | | 4/2005 | Tao | |
| 2005/0080535 A1 | | 4/2005 | Steinmetz | |
| 2005/0080537 A1 | | 4/2005 | Cawthorne | |
| 2005/0080538 A1 | | 4/2005 | Hubbard | |
| 2005/0080539 A1 | | 4/2005 | Hubbard | |
| 2005/0080540 A1 | | 4/2005 | Steinmetz | |
| 2005/0080541 A1 | | 4/2005 | Sah | |
| 2005/0119805 A1 | * | 6/2005 | Bischoff .................. | 701/22 |
| 2005/0167170 A1 | * | 8/2005 | Hisada et al. ............. | 180/65.2 |
| 2005/0182526 A1 | | 8/2005 | Hubbard | |
| 2005/0182543 A1 | | 8/2005 | Sah | |
| 2005/0182546 A1 | | 8/2005 | Hsieh | |
| 2005/0182547 A1 | | 8/2005 | Sah | |
| 2005/0189918 A1 | | 9/2005 | Weisgerber | |
| 2005/0247503 A1 | | 11/2005 | Imazu | |
| 2005/0252283 A1 | | 11/2005 | Heap | |

(Continued)

FOREIGN PATENT DOCUMENTS

CN        1709743 A     12/2005

(Continued)

*Primary Examiner* — Mark Hellner
*Assistant Examiner* — Helal A Algahaim

(57) ABSTRACT

A multivariate control method and system to control torque output from a powertrain system to a driveline is provided, to reduce driveline oscillations. The powertrain preferably comprises hybrid powertrain having a plurality of torque-generative devices connected to a transmission. Desired powertrain and driveline operating states are determined, as are a plurality of operating state errors. Each torque-generative device is controlled, based upon the operating state errors, and operating mode of the transmission. A damping torque command, additive to a commanded torque, is determined for one or more of the torque-generative devices based upon the determined transmission operating mode. Determined operating states include operator input, and powertrain/driveline including driveline torque; transmission input torque, rotational speed of the torque-generative devices; road load; and, accessory load.

4 Claims, 4 Drawing Sheets

U.S. PATENT DOCUMENTS

| | | |
|---|---|---|
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2005/0283283 A1 * | 12/2005 | Hisada et al. .................. 701/22 |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0112412 A1 | 4/2009 | Cawthorne |
| 2009/0118917 A1 | 5/2009 | Sah |
| 2009/0144002 A1 | 6/2009 | Zettel |

FOREIGN PATENT DOCUMENTS

| | | |
|---|---|---|
| EP | 1396368 A2 * | 3/2004 |
| WO | WO 03062004 A1 * | 7/2003 |

* cited by examiner

METHOD AND APPARATUS FOR MULTIVARIATE ACTIVE DRIVELINE DAMPING

TECHNICAL FIELD

This invention pertains generally to hybrid powertrain control systems, and more specifically to damping powertrain vibrations by controlling multiple torque inputs.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the preferable gear ratios for wide range operation.

One such parallel hybrid powertrain architecture comprises a two-mode, compound-split, electro-mechanical transmission which utilizes an input member for receiving power from a prime mover power source and an output member for delivering power from the transmission. First and second motor/generators are operatively connected to an energy storage device for interchanging electrical power between the storage device and the first and second motor/generators. A control unit is provided for regulating the electrical power interchange between the energy storage device and the first and second motor/generators. The control unit also regulates electrical power interchange between the first and second motor/generators.

Engineers implementing powertrain systems encounter driveline vibrations, which typically range from unnoticeable to objectionable to an operator. Driveline vibrations are customer dissatisfiers, and may reduce service life of one or more driveline components. Typically, engineers attempt to manage driveline vibrations by implementing systems which operate to cancel torque oscillations at one specific frequency, or over a range of frequencies, or a set of frequencies chosen based upon gear ratio at which the driveline is currently operating. Such torque cancellation systems typically pass driveline inputs through signal conditioning filters, which slow system responsiveness. Slow system response often leads to a bump or overshoot that occurs when there is an aggressive operator torque request, due to delays in transient responses required to develop filters. Such systems often use a single feedback variable, typically engine speed, and command a single control signal, typically engine torque. However, single feedback/single control vibration control systems do not provide adequate damping in a system having multiple devices operable to generate vibrations in a driveline.

A hybrid powertrain system is exemplary of a system having multiple devices operable to generate vibrations in a driveline, which therefore drives a need for an alternative method and apparatus to control driveline vibrations.

Therefore, there is a need for a method and apparatus to provide driveline damping for a hybrid powertrain control system over the operating range of the powertrain. There is a further need to provide driveability performance similar to that of a vehicle having a torque-converter in a vehicle equipped with a hybrid driveline, especially in a vehicle equipped with a hybrid driveline that incorporates manual transmission configurations such as direct connection between an engine, electric motors, and transmission input shafts.

SUMMARY OF THE INVENTION

The invention employs a multivariate feedback control approach to provide active driveline damping for a hybrid powertrain, or any powertrain that employs multiple torque-generative devices. The driveline is represented by a multiple mass-spring system, having multiple degrees of freedom, and multiple torque control devices. The dynamic response of the speed of each independent mass and the torque of each spring in the system is modeled. A desired trajectory for each speed and torque is computed and the actual speed and torques are compared to their respective desired trajectories. The vector of trajectory errors is multiplied by a matrix of feedback gains to form the coordinated commands sent to each torque-generative device. As such the entire dynamic trajectory of each component in the driveline is controlled. This eliminates axle overshoot, or first bump, in response to aggressive operator inputs, and provides complete control over all modes of oscillations that exist in the driveline. The feedback gain matrix values are preferably determined off-line for each transmission operating mode, i.e. each mode and gear configuration of the driveline, and stored as look-up tables in the controller. As the driveline switches among operating modes, the appropriate feedback gain matrix is selected from the look-up table. This approach provides dynamic coordination of all torque commands to control the transient response of the exemplary driveline using the hybrid transmission, including engine torque commands, electric motor torque commands, and clutch torque commands, as well as other controllable torque inputs.

It is therefore an aspect of this invention to provide a multivariate control method and system to control torque output from a powertrain system to a driveline, when the powertrain system comprises a plurality of torque-generative devices operably connected to a transmission. The method comprises constructing a matrix comprising desired operating states for the powertrain system and the driveline, and constructing a matrix of operating state errors. Each torque-generative device is controlled, based upon the matrix of operating state errors. Each torque-generative device is further controlled based upon transmission operating mode, which includes determining a specific transmission operating mode, e.g. mode or fixed gear at which the transmission is operating. A damping torque command is determined for one of the torque-generative devices based upon the determined transmission operating mode.

Another aspect of the invention includes determining the desired operating states for the powertrain system and the driveline, which comprises monitoring operator input, and monitoring of operating states of the powertrain system and the driveline. The operating states of the powertrain system and the driveline include a driveline torque; an input torque to the transmission; rotational speeds of each of the torque-generative devices and the transmission.

Another aspect of the invention includes determining a matrix of operating state errors by determining reference states for the powertrain and the driveline based upon the desired operating states, and comparing the matrix of the reference states with a matrix of actual reference states for the powertrain and driveline.

Another aspect of the invention includes determining the actual reference states including determining input torques to the transmission and a driveline axle torque, and determining rotational speeds of the torque-generative devices.

Another aspect of the invention includes determining predetermined ones of the reference states based upon a measurement thereof.

Another aspect of the invention includes determining predetermined ones of the reference states based upon an estimation thereof.

Another aspect of the invention includes determining a damping torque command for at least one of the torque-generative devices based upon the matrix of operating state errors.

Another aspect of the invention includes adjusting a predetermined command torque to one of the torque-generative devices with the determined damping torque command.

Another aspect of the invention comprises a method for damping oscillations in a driveline. This comprises controlling a torque output from a powertrain system comprising a plurality of individually-controllable torque generative devices operably connected to a two-mode, compound-split, electro-mechanical hybrid transmission, the transmission having a plurality of operating modes. The method includes determining a matrix of desired operating states for the powertrain system and the driveline, and determining a matrix of operating state errors. Each torque generative device is controlled based upon the operating state errors and the transmission operating mode.

Another aspect of the invention comprises a powertrain system having a plurality of torque-generative devices, each operable to generate torque deliverable to a transmission. The transmission is operable to deliver motive torque to a driveline. Included is a control system, operable to control: the integrated torque-generative devices, and, the transmission. The control system comprises a storage medium having a computer program encoded therein for effecting a multivariate control method to control motive torque output from the transmission to the driveline.

Another aspect of the invention includes the powertrain system comprising an internal combustion engine, and, a pair of electrical motors, operable to provide motive torque to a two-mode, compound-split, electro-mechanical hybrid transmission.

Another aspect of the invention includes the control system operable to control the transmission to a specific transmission operating mode, and thus further control each of the torque-generative devices based upon the transmission operating mode.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
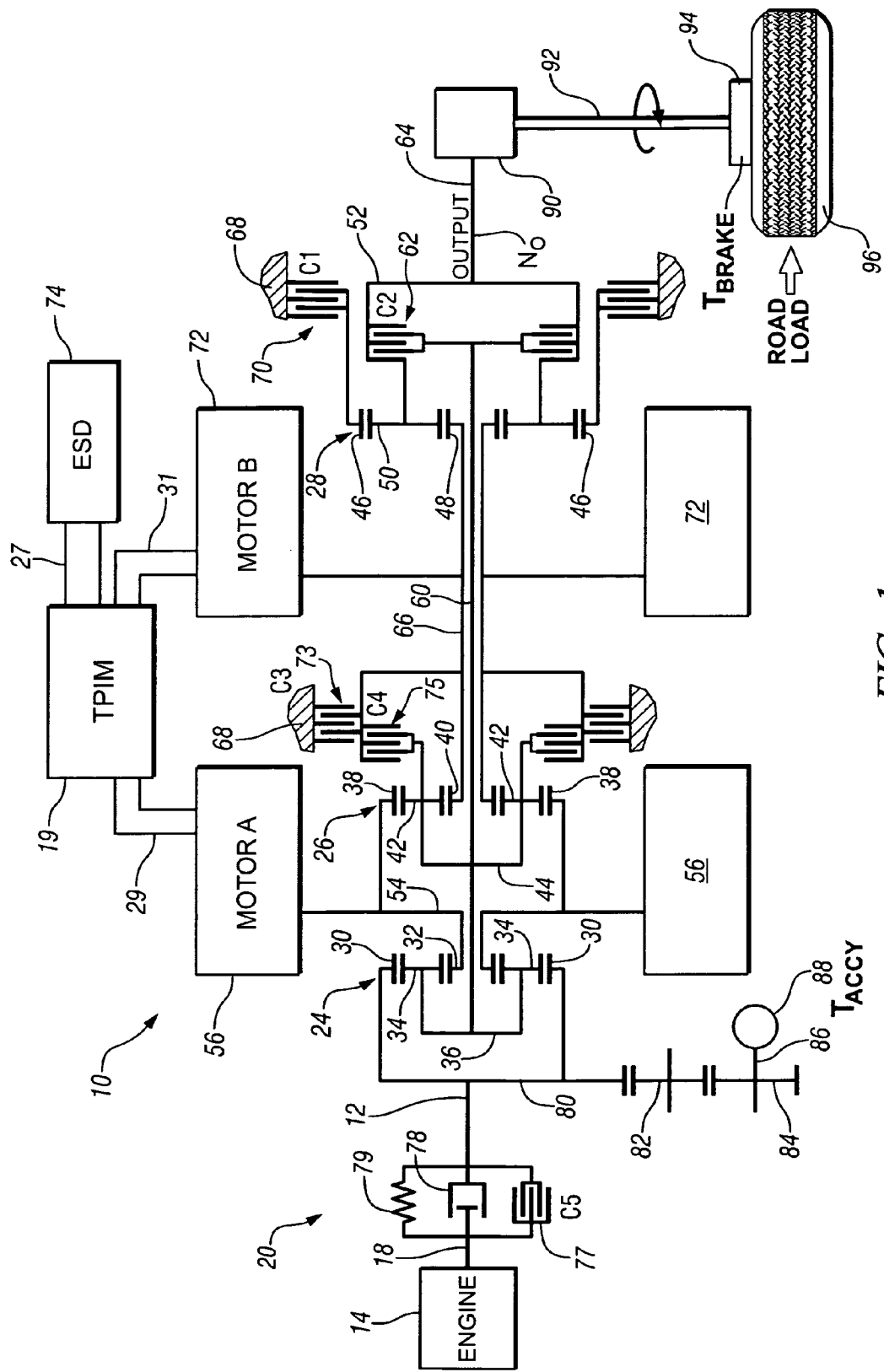
FIG. 1 is a schematic diagram of an exemplary powertrain, in accordance with the present invention.
Figure 2:
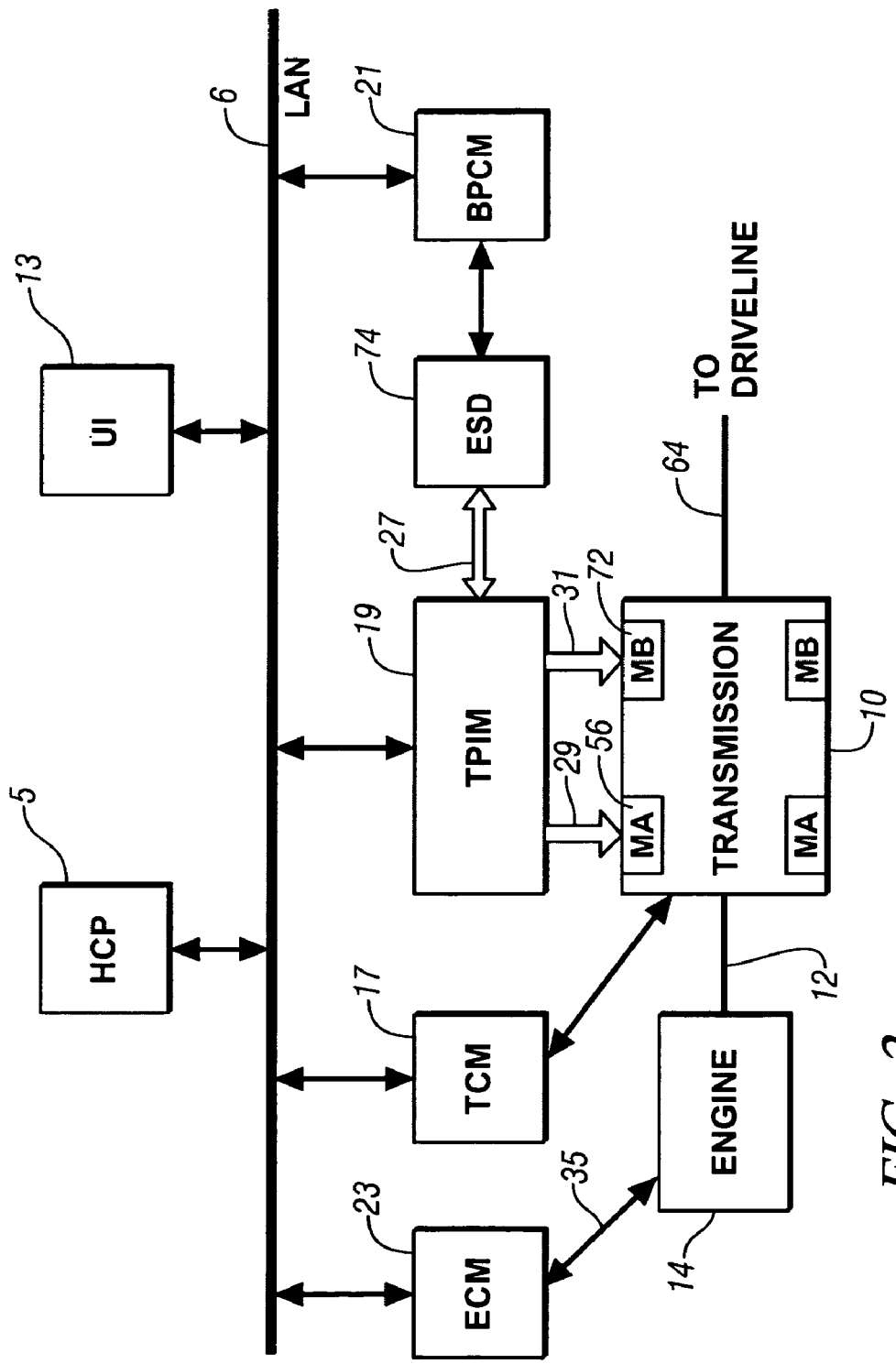
FIG. 2 is a schematic diagram of an exemplary architecture for a controller and powertrain, in accordance with the present invention.

Referring now to the drawings, wherein the showings are for the purpose of illustrating the invention only and not for the purpose of limiting the same, FIGS. 1 and 2 show a system comprising an engine 14, transmission 10, control system, and driveline which has been constructed in accordance with an embodiment of the present invention.

Mechanical aspects of exemplary transmission 10 are disclosed in detail in commonly assigned U.S. Patent Application Publication No. U.S. 2005/0137042 A1, published Jun. 23, 2005, entitled Two-Mode, Compound-Split, Hybrid Electro-Mechanical Transmission having Four Fixed Ratios, which is incorporated herein by reference. The exemplary two-mode, compound-split, electro-mechanical hybrid transmission embodying the concepts of the present invention is depicted in FIG. 1, and is designated generally by the numeral 10. The hybrid transmission 10 has an input member 12 that may be in the nature of a shaft which may be directly driven by an engine 14. A transient torque damper 20 is incorporated between the output shaft 18 of the engine 14 and the input member 12 of the hybrid transmission 10. The transient torque damper 20 preferably comprises a torque transfer device 77 having characteristics of a damping mechanism and a spring, shown respectively as 78 and 79. The transient torque damper 20 permits selective engagement of the engine 14 with the hybrid transmission 10, but it must be understood that the torque transfer device 77 is not utilized to change, or control, the mode in which the hybrid transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the hybrid transmission 10 utilizes three planetary-gear sets 24, 26 and 28. The first planetary gear set 24 has an outer gear member 30 that may generally be designated as a ring gear, which circumscribes an inner gear member 32, generally designated as a sun gear. A plurality of planetary gear members 34 are rotatably mounted on a carrier 36 such that each planetary gear member 34 meshingly engages both the outer gear member 30 and the inner gear member 32.

The second planetary gear set 26 also has an outer gear member 38, generally designated as a ring gear, which circumscribes an inner gear member 40, generally designated as a sun gear. A plurality of planetary gear members 42 are rotatably mounted on a carrier 44 such that each planetary gear 42 meshingly engages both the outer gear member 38 and the inner gear member 40.

The third planetary gear set 28 also has an outer gear member 46, generally designated as a ring gear, which circumscribes an inner gear member 48, generally designated as a sun gear. A plurality of planetary gear members 50 are rotatably mounted on a carrier 52 such that each planetary gear 50 meshingly engages both the outer gear member 46 and the inner gear member 48.

Ratios of teeth on ring gears/sun gears are typically based upon design considerations known to skilled practitioners and outside the scope of the present invention. By way of example, in one embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first motor/generator 56, also referred to as 'Motor A'.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 which, as will be hereinafter more fully explained, is employed to assist in the selection of the operational modes of the hybrid transmission 10. The carrier 52 of the third planetary gear set 28 is connected directly to the transmission output member 64.

In the embodiment described herein, wherein the hybrid transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 may be either front or rear wheels of the vehicle on which they are employed, or they may be a drive gear of a track vehicle. The drive members 96 may have some form of wheel brake 94 associated therewith. The drive members each have a speed parameter, $N_{WHL}$, comprising rotational speed of each wheel 96 which is typically measurable with a wheel speed sensor.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the hybrid transmission 10. The sleeve shaft 66 is also continuously connected to a second motor/generator 72, also referred to as 'Motor B'.

All the planetary gear sets 24, 26 and 28 as well as the two motor/generators 56 and 72 are coaxially oriented, as about the axially disposed shaft 60. Motor/generators 56 and 72 are both of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope, i.e., the circumferential dimension, of the transmission 10 is minimized.

A torque transfer device 73 selectively connects the sun gear 40 with ground, i.e., with transmission housing 68. A torque transfer device 75 is operative as a lock-up clutch, locking planetary gear sets 24, 26, motors 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump. Hydraulic actuation is accomplished using a known hydraulic fluid circuit, which is not described in detail herein.

The hybrid transmission 10 receives input motive torque from a plurality of torque-generative devices, including the engine 14 and the motors/generators 56 and 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first motor/generator 56 by transfer conductors 29, and the TPIM 19 similarly communicates with the second motor/generator 72 by transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines and provides AC current to the respective motor over transfer conductors 29 and 31. In regeneration control, the respective inverter receives AC current from the motor over transfer conductors 29 and 31 and provides current to the DC lines 27. The net DC current provided to or from the inverters determines the charge or discharge operating mode of the electrical energy storage device 74. Preferably, Motor A 56 and Motor B 72 are three-phase AC machines and the inverters comprise complementary three-phase power electronics.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off ('PTO') unit, designated either individually or collectively at 88, and comprise an accessory load.

Referring now to FIG. 2, a schematic block diagram of the control system, comprising a distributed controller architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and motors 56, 72. The distributed controller architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned controllers. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Each of the aforementioned controllers communicates with other controllers, sensors, and actuators via a local area network ('LAN') bus 6. The LAN bus 6 allows for structured communication of control parameters and commands between the various controllers. The specific communication protocol utilized is application-specific. By way of example, one communications protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, the HCP 5 generates various commands, including: an engine torque command, $T_{E\_CMD}$; clutch torque commands, $T_{CL\_N\_CMD}$ for the various clutches C1, C2, C3, C4 of the hybrid transmission 10; and motor torque commands, $T_{A\_CMD}$ and $T_{B\_CMD}$, for the electrical Motors A and B, respectively.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command, $T_{E\_CMD}$, from the HCP 5, and generates a desired axle torque, $T_{AXLE\_DES}$, and an indication of actual engine torque, $T_{E\_ACT}$, which is communicated to the HCP 5. For simplicity, ECM 23 is shown generally having bi-directional interface with engine 14 via aggregate line 35. Various other parameters that may be sensed by ECM 23 include engine coolant temperature, engine input speed ($N_E$) to a shaft leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques, $T_{CL\_N\_EST}$, for each of the clutches C1, C2, C3, and, C4 and rotational speed, $N_O$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes battery state-of-charge, Bat_SOC, and other states of the batteries, including voltage, $V_{BAT}$, and available power, $P_{BAT\_MIN}$ and $P_{BAT\_MAX}$.

The Transmission Power Inverter Module (TPIM) 19 includes a pair of power inverters and motor controllers configured to receive motor control commands and control inverter states therefrom to provide motor drive or regeneration functionality. The TPIM 19 is operable to generate torque commands for Motors A and B, $T_{A\_CMD}$ and $T_{B\_CMD}$, based upon input from the HCP 5, which is driven by operator input through UI 13 and system operating parameters. The predetermined torque commands for Motors A and B, $T_{A\_CMD}$ and $T_{B\_CMD}$, are adjusted with motor damping torques, $T_{A\_DAMP}$ and $T_{B\_DAMP}$, to determine motor torques, $T_A$ and $T_B$, which are implemented by the control system, including the TPIM 19, to control the Motors A and B. Individual motor speed signals, $N_A$ and $N_B$ for Motor A and Motor B respectively, are derived by the TPIM 19 from the motor phase information or conventional rotation sensors. The TPIM 19 determines and communicates motor speeds, $N_A$ and $N_B$, to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned controllers is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the controllers are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3, 6.25, 15, 25 and 100 milliseconds during ongoing engine and vehicle operation. Alternatively, algorithms may be executed in response to occurrence of an event.

In response to an operator's action, as captured by the UI 13, the supervisory HCP controller 5 and one or more of the other controllers determine required transmission output torque, $T_O$. Selectively operated components of the hybrid transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electro-mechanical hybrid transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
|---|---|---|
| Mode I | C1 70 | |
| Fixed Ratio 1 | C1 70 | C4 75 |
| Fixed Ratio 2 | C1 70 | C2 62 |
| Mode II | C2 62 | |
| Fixed Ratio 3 | C2 62 | C4 75 |
| Fixed Ratio 4 | C2 62 | C3 73 |

The various transmission operating modes described in the table indicate which of the specific clutches C1, C2, C3, C4 are engaged or actuated for each of the operating modes. Additionally, in various transmission operating modes, Motor A 56 or Motor B 72 may each operate as electrical motors, designated as MA, MB respectively, and whether Motor A 56 is operating as a generator, designated as GA. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Other factors outside the scope of the invention affect when the electrical machines 56, 72 operate as motors and generators, and are not discussed herein.

The control system, shown primarily in FIG. 2, is operable to provide a range of transmission output speeds, $N_O$, of shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of the motor/generators 56 and 72. Certain ranges of operation are described below in which fixed ratios are achieved by applying an additional clutch. This additional clutch may be clutch C3 73 or C4 75, as shown in the table, above.

When the additional clutch is applied, fixed ratio of input-to-output speed of the transmission, i.e. $N_I/N_O$, is achieved. The rotations of the motor/generators 56, 72 are dependent on internal rotation of the mechanism as defined by the clutching and proportional to the input speed, $N_I$, determined or measured at shaft 12. The motor/generators function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from Motors A and B, through planetary gear set 28 by accepting power from the energy storage device 74.

The transmission operating mode can be switched between Fixed Ratio operation and Mode operation by activating or deactivating one the additional clutches during Mode I or Mode II operation. Determination of operation in fixed ratio or mode control is by algorithms executed by the control system, and is outside the scope of this invention.

The modes of operation may overlap the ratio of operation, and selection depends again on the driver's input and response of the vehicle to that input. RANGE 1 falls primarily within mode I operation when clutches C1 70 and C4 75 are engaged. RANGE 2 falls within mode I and mode II when clutches C2 62 and C1 70 are engaged. A third fixed ratio range is available primarily during mode II when clutches C2 62 and C4 75 are engaged, and a fourth fixed ratio range is available during mode II when clutches C2 62 and C3 73 are engaged. It is notable that ranges of operation for Mode I and Mode II typically overlap significantly.

Output of the exemplary powertrain system described hereinabove is constrained due to mechanical and system limitations. The output speed, $N_O$, of the transmission measured at shaft 64 is limited due to limitations of engine output speed, $N_E$, measured at shaft 18, and transmission input speed, $N_I$, measured at shaft 12, and speed limitations of the electric Motors A and B, designated as $+/-N_A$, $+/-N_B$. Output torque, $T_O$, of the transmission 64 is similarly limited due to limitations of the engine input torque, $T_E$, and input torque, $T_I$, measured at shaft 12 after the transient torque damper 20, and torque limitations ($T_{A\_MAX}$, $T_{A\_MIN}$, $T_{B\_MAX}$, $T_{B\_MIN}$) of the Motors A and B 56, 72.

Figure 3:
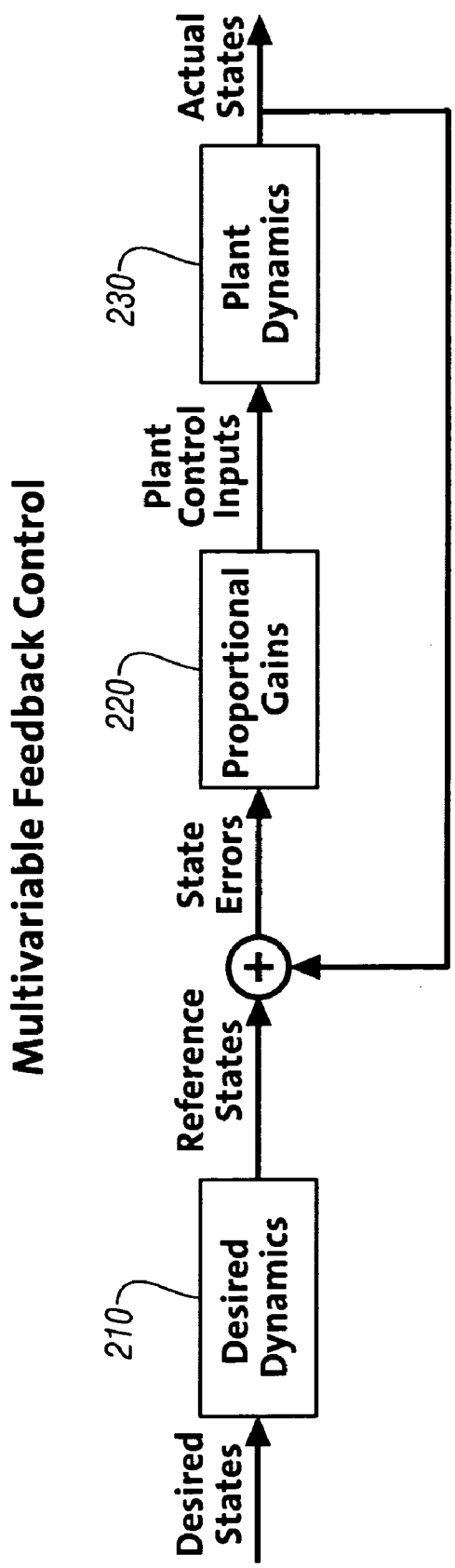
FIG. 3 is a schematic diagram of an exemplary control system, in accordance with the present invention; and, FIG. 4 is a detailed schematic diagram of an exemplary control system, in accordance with the present invention.
Figure 4:
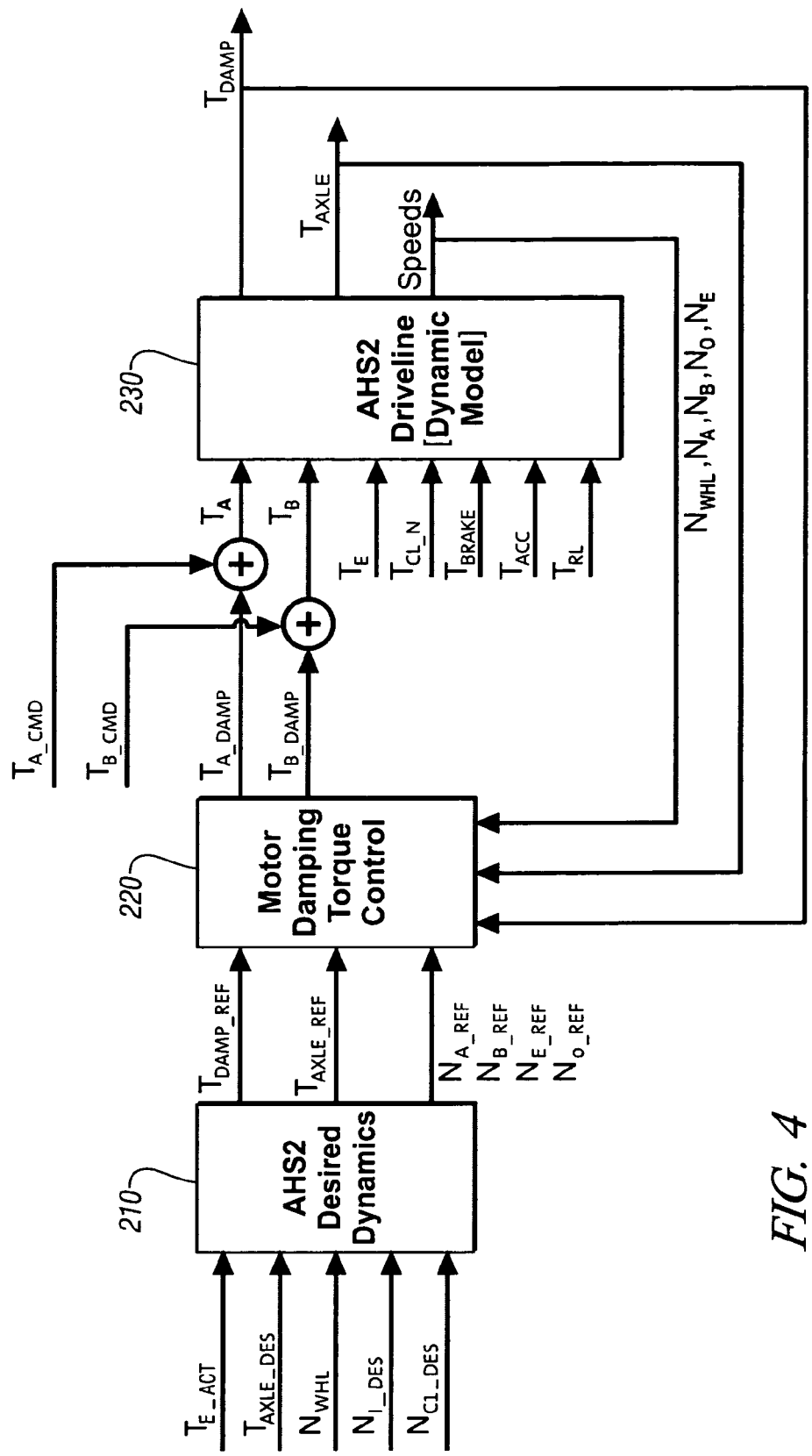

Referring now to FIGS. 3 and 4, a control scheme is shown, comprising a multivariate feedback control system preferably executed as algorithms in the controllers of the control system described hereinabove with reference to FIG. 2, to control operation of the system described with reference to FIG. 1. The control scheme described hereinafter comprises a subset of overall vehicle control architecture.

Referring again to FIG. 3, the multivariate feedback control system comprises an overall operation wherein a plurality of desired system states are translated by desired dynamics 210 to create reference states. The reference states are compared to actual operating states to determine state errors, which comprise a feedback system. The state errors are subjected to a plurality of proportional gain factors 220 to determine plant control inputs, which are input to a physical plant 230 having determinable dynamics, to control actual operating states.

Referring now to FIG. 4, the multivariate feedback control method and system comprises basic elements for controlling torque outputs from the torque-generative devices 14, 56, 72 through the transmission 10 to the axle 92 of the driveline, which have been described with reference to FIGS. 1 and 2, above. This includes the overall control elements of determining reference parameters for a plurality of operating states, based upon current operating conditions and desired operating conditions, through a desired dynamics control scheme 210. In this embodiment, the motor damping torque control scheme 220 is operable to determine motor damping torques for controlling the torque-generative devices, i.e. Motor A 56, and Motor B 72, based upon the aforementioned reference parameters, and a plurality of operating state errors that comprise feedback from the powertrain and driveline 230, each which have determinable dynamic properties.

The outputs from motor damping torque control 220 comprise electrical motor damping torques, $T_{A\_DAMP}$ and $T_{B\_DAMP}$, which are combined with electrical motor commanded torques, $T_{A\_CMD}$ and $T_{B\_CMD}$, to derive motor torque values, $T_A$ and $T_B$. The motor torques, $T_A$ and $T_B$, are used by the control system, in conjunction with other driveline dynamic control operations, to control and manage operation of the driveline 230. The driveline is represented in this drawing as item 230, having a plurality of forces acting upon it, and having outputs determinable by the dynamic forces acting upon the driveline and individual characteristics of the driveline, including mass and inertial forces. This operation is further described hereinafter.

The control system determines desired dynamics for the powertrain and driveline by monitoring or determining parameters for various operating states, including actual engine torque, $T_{E\_ACT}$, a desired axle torque, $T_{AXLE\_DES}$, average driven-wheel speed, $N_{WHL}$, desired rotational input speed to the transmission, $N_{I\_DES}$, and desired speed at clutch C1, $N_{C1\_DES}$, as shown at 210. Actual engine torque,

is determinable based upon measured speed ('RPM') and load of the engine 14. Desired axle torque, $T_{AXLE\_DES}$, is determinable based upon operator inputs to the UI 13, preferably either as inputs to the accelerator pedal, transmission gear selector, vehicle braking system, and other operator inputs, e.g. vehicle speed cruise control. The average driven-wheel speed, $N_{WHL}$, comprises a measure of average driven-wheel speed, preferably based upon signal inputs from wheel speed sensors mounted on each of the driven wheels. Alternatively, average driven-wheel speed, $N_{WHL}$, comprises an estimate of wheel speed, based upon an output of a dynamic model of the driveline. Desired input speed, $N_{I\_DES}$, comprises input speed to the transmission 10, as measured at shaft 12. Desired speed at clutch C1, $N_{C1\_DES}$, comprises a determination of desired speed of clutch C1 70. The aforementioned inputs are used to determine a desired operating state for each of the torque-generating devices, in terms of reference parameters for operating states. The preferred reference parameters include: damper torque, $T_{DAMP\_REF}$, which is the reference input torque to the transmission at shaft 12, after the transient torque damper 20; axle torque, $T_{AXLE\_REF}$, determinable at axle 92; and, motor and shaft speeds, $N_{A\_REF}$, $N_{B\_REF}$, $N_{O\_REF}$, $N_{E\_REF}$, and wheel speed, $N_{WHL}$.

The reference parameters defining each operating state are used as inputs the motor damping torque control scheme 220, in conjunction with feedback parameters $T_{DAMP}$, $T_{AXLE}$, and speeds, $N_A$, $N_B$, $N_E$, $N_O$, $N_{WHL}$. A first matrix is formed, comprising a single dimensional matrix, or vector, containing the reference parameters, $T_{DAMP\_REF}$, $T_{AXLE\_REF}$, $N_{A\_REF}$, $N_{B\_REF}$, $N_{O\_REF}$, $N_{E\_REF}$, $N_{WHL}$. A second matrix is formed, comprising the feedback parameters, $T_{DAMP}$, $T_{AXLE}$, and speeds, $N_A$, $N_B$, $N_E$, $N_O$, $N_{WHL}$. The second matrix is multiplied by a gain factor matrix, to calculate a feedback matrix. There is an individual gain factor matrix determined for each transmission operating mode, i.e. the specific operating mode and gear configuration, described hereinabove with reference to Table 1. In this embodiment the gain factor matrices are determined off-line, and stored as calibration values in one of the on-board controllers. There are preferably seven gain factor matrices, one corresponding to each of the six transmission modes described with reference to Table 1, and a gain factor for the transmission in a neutral position.

The first matrix and the feedback matrix are input to the motor damping torque control scheme 220. The motor damping torque control scheme 220 preferably comprises an embedded controller wherein a plurality of equations is simultaneously solved using matrix algebraic techniques. The simultaneously solved equations are operable to determine damping torques for Motor A and Motor B, $T_{A\_DAMP}$ and $T_{B\_DAMP}$, based upon the operating state parameters contained in the first matrix and the feedback matrix. By taking into account all components of the driveline from the input torques to the wheel, the multivariate control system is able to dynamically control the driveline to dampen oscillations.

The feedback parameters, $T_{DAMP}$, $T_{AXLE}$, $N_A$, $N_B$, $N_E$, $N_O$, $N_{WHL}$ are determinable by direct measurement of the specific parameter using one or more sensors which input data to one of the controllers, possibly subjected to analog to digital conversion, filtering, calibration, and other manipulations, to attain a signal representative of the measured parameter. Direct measurement of parameters with sensors is well-known. Alternatively, one or more of the feedback state parameters, $T_{DAMP}$, $T_{AXLE}$, $N_A$, $N_B$, $N_E$, $N_O$, $N_{WHL}$ may be determined by estimation, using one or more feedback-based inference equations executed as algorithms in the control system. An exemplary method and apparatus for state parameter estimation is described in commonly assigned and co-pending U.S. patent application Ser. No. 11/386,262; entitled STATE PARAMETER ESTIMATION, which is incorporated herein by reference, so that estimation of various state parameters need not be described in detail. Estimated state parameters may include parameters for operating states $T_{DAMP}$, $T_{AXLE}$, $N_A$, $N_B$, $N_E$, $N_O$, $N_{WHL}$. Additionally, parameters for operating states for motor torque values, $T_A$ and $T_B$, engine torque $T_E$, clutch torques $T_{CLn}$, to clutches C1, C2, C3, C4, brake torque $T_{BRAKE}$, accessory load $T_{ACC}$, and road load, $T_{RL}$ may be estimated.

The damping values for Motors A and B, $T_{A\_DAMP}$ and $T_{B\_DAMP}$, are added to commanded torque values, $T_{A\_CMD}$ and $T_{B\_CMD}$, previously determined as part of ongoing powertrain control, as described hereinabove. The damping torques, $T_{A\_DAMP}$ and $T_{B\_DAMP}$, may be positive or negative, thus increasing or decreasing the respective commanded torque values. The resultant motor torque values, $T_A$ and $T_B$, are applied by the control system, in conjunction with other driveline dynamic control operations, to control and manage operation of the powertrain and driveline. Other input parameters to the driveline 230 include engine torque $T_E$, clutch torques $T_{CL\_N}$, to clutches C1, C2, C3, C4 respectively, brake torque $T_{BRAKE}$, accessory load $T_{ACC}$, and road load, $T_{RL}$, and the transmission operating mode. Dynamic operation of the driveline, in response to the aforementioned inputs, will be determined based upon current operating states of the driveline, and specific implementation of the driveline, including various masses and inertial values.

The distributed controller architecture described with reference to FIG. 2, and the algorithmic structure described herein is executed in a manner that causes the execution of the multivariate active driveline damping control scheme to be achieved in real-time, i.e. there is limited or no lag time in determining the various states, thus eliminating or minimizing potential for loss of dynamic control of the system.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Multivariate control method for controlling torque output from a powertrain system to a driveline, the powertrain system comprising a plurality of torque-generative devices operably connected to a transmission operative to transmit torque to the driveline in fixed ratio and mode operating modes, comprising:
   monitoring an input torque to the transmission, an output torque to the driveline, and transmission operating speeds comprising an input speed, an output speed and rotational speeds of the torque-generative devices during operation in a selected one of the fixed ratio and mode operating modes;
   determining desired operating states for the powertrain system and the driveline for the selected one of the fixed ratio and mode operating modes;
   defining reference operating states for the input torque to the transmission, the output torque to the driveline, and the transmission operating speeds, the reference operating states responsive to the desired operating states for the powertrain system and the driveline for the selected one of the fixed ratio and mode operating modes;
   comparing first and second matrices to determine damping torque commands for each of the torque-generative devices, the first matrix comprising the reference operating states for the input torque to the transmission, the output torque to the driveline, and the transmission operating speeds, and the second matrix associated with the monitored input torque to the transmission, the monitored output torque to the driveline, and the monitored transmission operating speeds corresponding to the selected one of the fixed ratio and mode operating modes of the transmission; and
   controlling each of the torque-generative devices responsive to based upon the damping torque commands.

2. The method of claim 1, wherein determining the second matrix associated with the monitored input torque to the transmission, the monitored output torque to the driveline, and the monitored transmission operating speeds corresponding to the selected one of the fixed ratio and mode operating modes of the transmission comprises:
   determining a matrix of feedback parameters corresponding to the monitored input torque to the transmission, the monitored output torque to the driveline and the monitored transmission operating speeds; and
   adjusting the matrix of feedback parameters with a predetermined gain factor matrix associated with the selected one of the fixed ratio and mode operating modes.

3. The method of claim 2, further comprising:
   monitoring an output speed of a driven wheel; and
   defining a reference operating state for the output speed of the driven wheel;
   wherein the first matrix further comprises the reference state for the output speed of the driven wheel and the matrix of feedback parameters further corresponds to the monitored output speed of the driven wheel.

4. The method of claim 2, further comprising
   establishing a plurality of gain factor matrices, each corresponding to one of the fixed ratio and mode operating modes; and
   selecting as the predetermined gain factor matrix the one of the plurality of gain factor matrices corresponding to the selected one of the fixed ratio and mode operating mode of the transmission.

* * * * *